Sept. 27, 1938.  F. J. KURTH  2,131,054
COMBINED VENTILATING AND ILLUMINATING DEVICE
Filed March 21, 1935
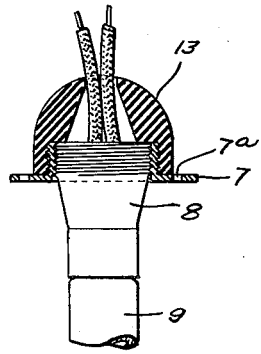
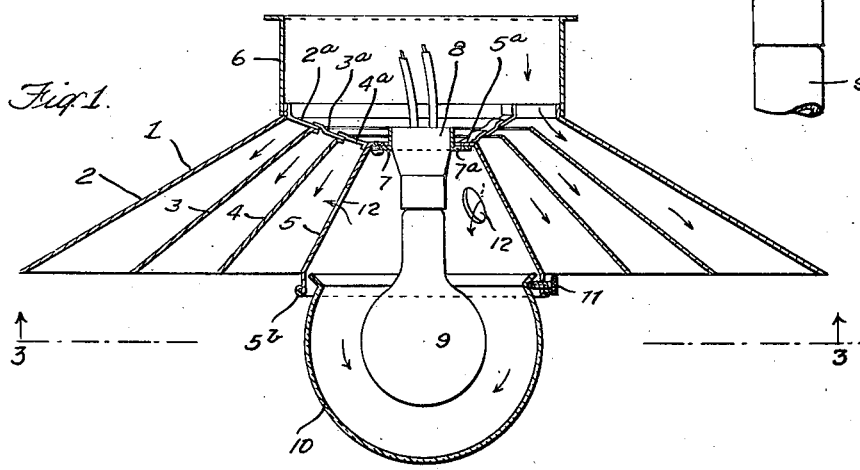
INVENTOR
FRANZ J. KURTH
BY
ATTORNEY Patented Sept. 27, 1938

2,131,054

UNITED STATES PATENT OFFICE 2,131,054

COMBINED VENTILATING AND ILLUMINATING DEVICE

Franz J. Kurth, London, England, assignor to Anemostat Corporation of America, a corporation of Delaware Application March 21, 1935, Serial No. 12,194

2 Claims. (Cl. 240—78)

My invention relates to air and gas distributing devices and more particularly air distributing devices used for the ventilation of closed spaces, e. g., rooms, closed cars etc., more commonly known as ventilating devices, and in particular, my invention relates to ventilating devices, whereby air is introduced into and circulated in rooms without any sensation of draft being had by the occupants of the room. In the particular ventilating devices referred to, this is accomplished by a division of the incoming flow of air into a plurality of separate air currents flowing in various directions while, at the same time, the energy of the air flow is gradually reduced. Ventilating devices of this sort comprise a plurality of mutually spaced partitions or individual members so disposed relative to each other as to form several air passages, preferably of gradually increasing cross-sectional area toward their outlet ends, said passages all being in communication with an air inlet conduit, through which air is continually supplied.

The present invention has for its object to combine with such ventilating devices illuminating means, e. g. light fixtures, in such a way as to make the illuminating means, or light fixtures, an inherent part of the ventilating device. Another object of my invention is to so incorporate the light fixtures or illuminating means in the ventilating device that a portion of the incoming air will be circulated around the light giving elements, e. g., bulbs, etc., so as to carry away the heat generated thereby. A further object of my invention is to so arrange the light fixtures as to make them readily accessible for any repairs, or the exchange of the illuminating elements, e. g., bulbs, etc.

In making my invention more fully and clearly understood, I refer to the accompanying drawing, on which, by way of illustration, I have shown a preferred embodiment of my invention, and on which Fig. 1 is a sectional view of a ventilating device and combined therewith and incorporated therein a light fixture; and Fig. 2 shows a detail.

At 1 in Fig. 1 is shown an air distributing or ventilating device, which comprises a plurality of individual preferably flaring hollow members of gradually decreasing size designated by the numerals 2, 3, 4 and 5, which, as shown, are mutually spaced from each other so as to form air passageways of gradually increasing cross-sectional areas. The largest of the said flaring members, member 2, is secured to, or made integral with, a tubular part shown at 6, which is connected with, or inserted into, an air conduit (not shown) through which air is supplied to the several air passageways formed by and between the said members, 2, 3, 4 and 5. The members 3, 4 and 5 are connected with the member 2 and with each other by stays, or braces, shown at 2a, 3a and 4a. The innermost member 5 is provided with an annular flange 5a, to which may be detachably secured, by screws or otherwise, a plate 7 which is provided with holes shown at 7a. Said plate is designed to hold a lamp-socket shown at 8, which has a standard thread therein to receive the threaded stem of a light bulb shown at 9. At 10 is shown a globe which surrounds the light-bulb 9 and may be held in place by small screws 11, which extend through threaded holes in a depending flange 5b provided on the lower rim of the innermost flaring member 5.

The air which, in the direction of the arrow shown in Fig. 1, enters the tubular part 6 is subdivided by the partitions formed by the several members 2, 3, 4 and 5 into a plurality of separate air currents. Because of the gradually increasing cross-sectional areas of the several air passageways between the said various members, the energy of flow of the several air currents is considerably reduced so that no sensation of draft is produced by the air as it escapes from the various passageways into the room.

In order to dissipate the heat generated by the light bulb 9 which is enclosed in the globe 10, I provide in addition to the holes 7a above referred to in the innermost member 5 apertures of which two are shown in Fig. 2 at 12. Through these apertures as well as the holes 7a a continual circulation of air around the light bulb 9 is afforded, whereby the heat generated thereby is carried away.

From the foregoing description and the drawing it will readily appear that easy access is possible to the lamp-socket 8, in case any of the wires feeding the current to the light bulb 9 should become defective. All that one has to do in that case is to first release the globe 10 from the screws 11 holding the globe in place, and then release the plate 7 which supports the lamp-socket. The latter can then be pulled down within convenient reach.

In order to prevent the incoming current of air from striking the sharp upper edges of the lamp-socket thereby possibly causing an annoying sound, I provide, as shown at 13 in Fig. 2, a rounded cap, which covers the sharp edges and is secured in position in any suitable practical manner, as, for instance, by being threaded onto the socket 8, or being simply fitted thereto.

As shown in the drawing the illuminating means is so disposed relative to the air distributing body, or air flow control means, that the latter will act as a reflector of the light rays emanating from the illuminating means. To enhance the reflector effect, the inner surface of the air distributor or the member immediately surrounding the illuminating means is highly polished or suitably treated, e. g., by being coated with a white enamel.

While I have shown and herein described a preferred embodiment of my invention, I do not limit myself, of course, to this construction, because further changes and modifications may be made without a departure from the spirit and essence of my invention.

I claim:

1. In a combined air distributing and illuminating device, the combination with a plurality of successively larger, mutually spaced hollow flaring members providing between them a plurality of flaring annular passageways, of an electric lamp disposed within the device and separated from said passageways by the wall of one of said members, the innermost member having a flange at the top and a depending flange at the lower rim, a lamp socket supported by the top flange, and a globe supported by the depending flange, said wall having apertures therein of such size and in such relationship to said lamp that fresh outside air flowing in said passageway through said apertures is compelled to flow in continual contact with said lamp so as to absorb its heat.

2. In a combined air distributing and illuminating device, the combination with a plurality of successively larger, hollow, flaring members spaced apart to provide a plurality of air passageways therebetween, of a lamp socket supported by the inner end portion of the innermost member, a lamp supported by said socket and disposed within said innermost member, and a globe supported by the outer end portion of said innermost member in shielding relationship to said lamp, said innermost member having apertures therein of a size and disposed in such relationship to said lamp that outside air flowing into said innermost member through said apertures is compelled to flow in continued contact with said lamp so as to absorb its heat.

FRANZ J. KURTH.